April 24, 1934.   G. C. NEAULT ET AL   1,956,513
PISTON RING
Filed Aug. 4, 1933    2 Sheets-Sheet 2

Inventors
Grover C. Neault,
Christ O. Wold,
By Clarence A. O'Brien
Attorney

Patented Apr. 24, 1934

1,956,513

UNITED STATES PATENT OFFICE 1,956,513

PISTON RING

Grover C. Neault and Christ O. Wold, Ashland, Wis.

Application August 4, 1933, Serial No. 683,696

1 Claim. (Cl. 309—29)

The present invention relates to new and useful improvements in piston rings of the type including a plurality of superposed split sections and has for its primary object to provide, in a manner as hereinafter set forth, a piston ring of this character embodying novel means for preventing aligning of the gaps of the sections which, as is well known, frequently occurs in multiple section rings in widespread use at present and which results in "blow-bys", loss of compression and oil as well as carbonizing the combustion chambers of the engine.

Other objects of the invention are to provide a piston ring of the character described which will be comparatively simple in construction, strong, durable, highly efficient and reliable in use and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1:
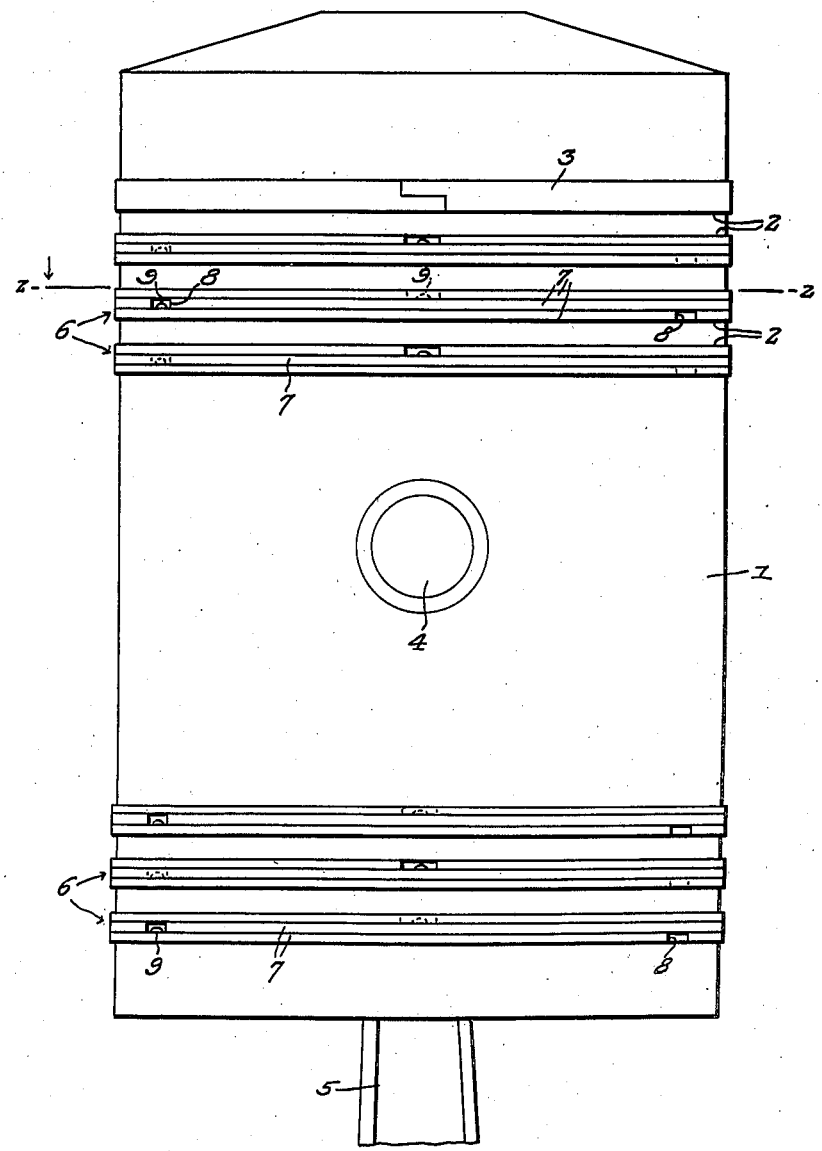
Figure 1 is a view in side elevation of a piston equipped with a plurality of rings in accordance with the present invention.
Figure 2:
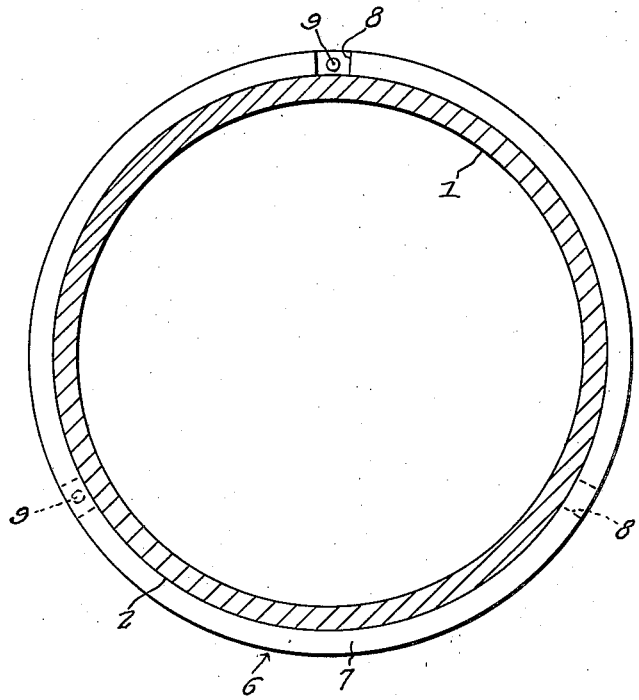
Figure 2 is a view in horizontal section, taken substantially on the line 2—2 of Figure 1.
Figure 3:
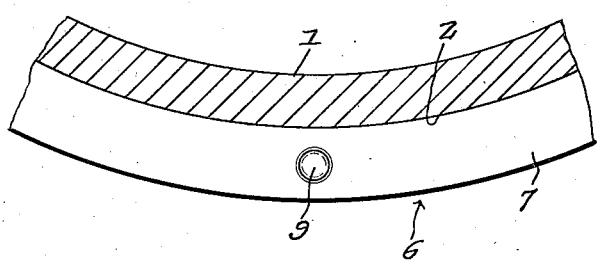
Figure 3 is a fragmentary view in horizontal section through a portion of the piston showing, in plan, an intermediate portion of one of the ring sections.

Referring now to the drawings in detail, it will be seen that the reference numeral 1 designates a conventional piston having a plurality of ring grooves 2 therein.

A step cut compression ring 3 of the usual construction is mounted in the uppermost groove. The piston 1 is, of course, provided with a wrist pin 4 to which the connecting rod 5 is coupled.

The rings constituting the present invention are designated generally by the reference numeral 6. Each ring 6 includes a plurality of comparatively thin, flat, split sections 7 of suitable resilient metal which are mounted in all but the uppermost of the piston grooves 2 in superposed relation to each other. Of course, each ring 6 may comprise any desired number of sections 7 as will be understood. Further, as many of the rings 6 constituting the present invention as desired may be installed on the piston.

Figure 4:
Figure 4 is a transverse sectional view through one of the ring sections.

The sections 7 constituting each ring are arranged relative to each other so that none of the gaps 8 are in communication with each other. To maintain the sections 7 in this position relative to each other, upwardly pressed teats which constitute stops 9 are formed at an intermediate point on all but the uppermost section 7 for engagement in the gap 8 of the superjacent section. It will thus be seen that while the rings 6 will not be positively retained against rotation in the grooves of the piston, relative rotation of the sections 7 will be prevented thereby preventing aligning of the gaps 8. As illustrated to advantage in Figure 4 of the drawings, the stops 9 are substantially in the form of teats or humps which are pressed upwardly from the sections 7, the formation of said stops in this manner being facilitated by reason of the comparatively thin, flat construction of said sections. This construction permits the sections and stops to be formed from a single piece of material and eliminates the necessity for drilling holes in the sections with the resulting weak points.

It is believed that the many advantages of a piston ring constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

A piston ring of the class described comprising a plurality of comparatively thin, flat sections arranged in superposed relation, the ends of each section being spaced defining plane vertical parallel walls providing a gap, the gap of each section being staggered relative to the gaps of the adjacent sections, and integral stops pressed upwardly in intermediate portions of all but the uppermost of the sections and disposed in the gaps of the superjacent sections for preventing relative rotation of said sections.

GROVER C. NEAULT.
CHRIST O. WOLD.